Jan. 27, 1959  D. F. ALTEMUS ET AL  2,871,031
PIPE COUPLING
Filed Oct. 11, 1955
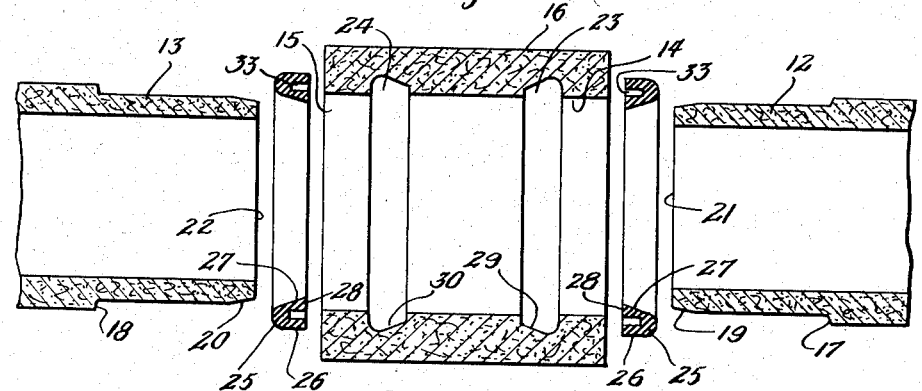
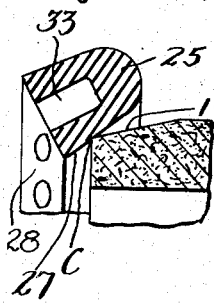
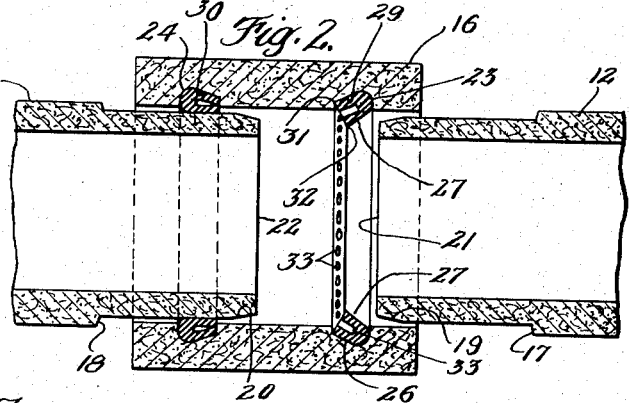
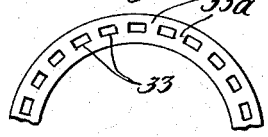
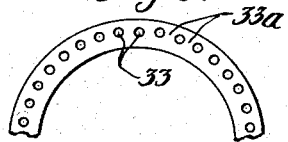
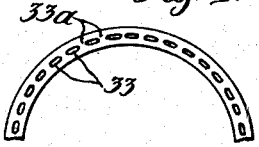
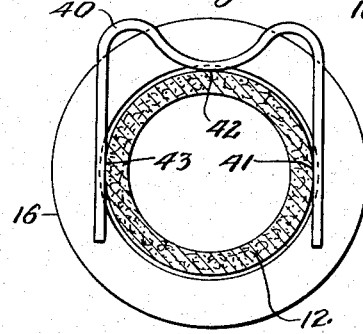
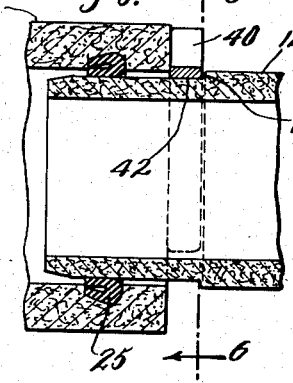
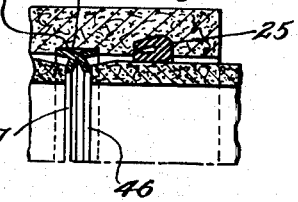
INVENTORS
Daniel F. Altemus
and
Robert A. Schneider
Synnestvedt & Lechner
ATTORNEYS

United States Patent Office 2,871,031
Patented Jan. 27, 1959

2,871,031

PIPE COUPLING

Daniel F. Altemus, Norristown, and Robert A. Schneider, Springfield Township, Montgomery County, Pa., assignors to Keasbey & Mattison Company, Ambler, Pa., a corporation of Pennsylvania Application October 11, 1955, Serial No. 539,826

2 Claims. (Cl. 285—18)

This invention relates to couplings for joining conduit elements. The invention is of special advantage when used with conduit and coupling elements made of asbestos-cement or like material, i. e., material composed essentially of fibrous matter and a hydraulic binder.

The invention is an improvement over that disclosed in the U. S. Patent to Turner No. 2,294,142, August 25, 1942, assigned to the assignee of the present application. The Turner patent discloses a pipe joint utilizing a double socket member in the general form of a hollow cylinder of inside diameter slightly greater than the outside diameter of the conduit elements to be joined. The internal surface of each socket is annularly grooved and provided with a ring gasket which cooperates with the end of a conduit element inserted into the socket.

The invention involves a number of improvements over various constructions shown in the prior art, including that of the Turner patent, including an improved gasket which is easier and less expensive to manufacture, which stays in position better, and which makes possible the assembly of the pipe joint in a different and markedly easier manner. In addition the invention provides for positive spacing of the conduit elements within the assembly in a manner which insures freedom of expansion and contraction of the pipe sections as well as freedom for axial misalignment during normal use.

The primary object of the invention is to provide a coupling for conduit elements which, while insuring tight sealing and thus preventing leakage into or out of the pipe, nevertheless may be readily and quickly assembled in the field, with much less force than that needed for various prior arrangements, and frequently even manually.

Another object of the invention is to provide means for positively controlling the spacing of the conduit elements within the socket structure, while at the same time insuring the maintenance of adequate expansion and contraction space.

Still further the invention has as an object the provision of a coupling for pipes of the kind described which will function adequately and prevent leaking even when the pipe sections are angularly misaligned with respect to each other by as much as 5°.

Yet another object is to provide a specially shaped gasket which, while being easier and less expensive to manufacture, maintains itself firmly in position within the coupling even before the conduit elements are inserted into the coupling sockets.

Other objects and advantages of the invention will be clear from the following description taken in connection with the accompanying drawings, in which:

Figure 1 is a longitudinal sectional elevation showing the coupling parts of the invention separated and in position for assembly;

Figure 2 is a sectional elevation similar to Figure 1 but showing the gaskets in position in the socket grooves and also showing one pipe section inserted into its socket;

Figure 2a is a fragmentary sectional elevation similar to the right hand portion of Figure 2 but on an enlarged scale and showing a conduit just as it first contacts a gasket during assembly;

Figure 3 is a fragmentary end view of the gasket shown in Figure 1 illustrating the arrangement of recesses around the face remote from the mouth;

Figure 4 is a fragmentary view of a gasket similar to Figure 3 but this view illustrates the gasket in compressed or deformed position (as shown in the left hand portion of Figure 2);

Figure 5 is a sectional elevation similar to the left hand portion of Figure 2 and further showing a positioning tool cooperating with the socket member and the shoulder on the pipe section;

Figure 6 is a transverse sectional view taken on the line 6—6 of Figure 5;

Figure 7 is a fragmentary view similar to Figure 3 but showing a modified gasket having rectangular recesses; and Figure 8 is a fragmentary sectional view showing a second embodiment of the spacing means of the invention.

In Figure 1 the conduit elements 12—13, which may either be pipe sections or pipe fittings, are shown axially aligned and positioned adjacent the entrances of the sockets 14 and 15 of the generally cylindrical coupling or double socket member 16. In this embodiment of the invention the conduit elements are shouldered as at 17—18 for reasons brought out fully herebelow. Although it may not be needed for all purposes, to assist in assembly, the ends of the conduit elements are preferably tapered as at 19 and 20 adjacent the end faces 21 and 22. Internal grooves 23 and 24 are provided adjacent the entrance ends of the sockets 14 and 15 for cooperation with specially formed gaskets.

Figure 1 shows one form of gasket according to the invention in its relaxed position outside of the socket member. As there seen the gasket comprises a main body 25 having a substantially cylindrical external surface 26, an inclined internal surface 27, and an axial face 28 lying transversely of the axis. The surface 27 is inclined in direction so that, after insertion of the gasket into a groove in the socket member 16, the gasket will present an enlarged mouth for first receiving the end of a conduit element as it is inserted into the socket.

The grooves 23 and 24 have inclined peripheral surfaces 29 and 30 for cooperation with the generally cylindrical external surface 26 of the gasket. The surfaces 29 and 30 are oppositely inclined in direction so that a gasket inserted into the groove will be deformed out of its relaxed position in such fashion as to increase the angle of inclination of the surface 27 of the gasket. The right-hand portion of Figure 2 illustrates a gasket deformed so as to fit into the groove 23. The inclination of the surface 29 in effect rolls the gasket partially inside out and, since the gasket is formed of resilient material, a force will be exerted toward the inclined groove surface, tending to roll the gasket back into its relaxed position. It is this force which serves to retain the gasket in position in the groove even prior to the insertion of a conduit element into the socket, and which provides an initial pressure urging the gasket surface 26 and the groove surface 29 into tight contact with each other so that a seal is always provided between the coupling 16 and the gasket 25 even though acceptable commercial tolerances are applied to both parts.

As best seen in Figure 2a, when a gasket is in place in a socket groove the angle of inclination of the inner surface 27 of the gasket (with respect to the axis of the conduit) is greater than that of the tapered surface 19 on the conduit end. This relationship is of importance in minimizing friction by avoiding inital surface contact between the two inclined surfaces. It also ensures that the first point on the conduit to contact the gasket will be the leading edge of the inclined surface 19, rather than the trailing edge. The force exerted on the gasket by the leading edge at the moment of initial contact will tend to push the gasket more tightly into its groove. If the trailing edge hits the gasket first, the force exerted might end to roll the gasket out of the groove.

As shown in Fig. 2, the free edge of the gasket surface 26 provides a lip 31 for cooperation with the surface of the groove 29—30, while the free edge of the gasket surface 27 provides a corresponding lip 32 for cooperation with the surface of the conduit element after it is inserted into the socket. The minimum diameter of the gasket (that is, the diameter of the lip 32 when the gasket is in position in a groove) is smaller than the outside diameter of the end portion of the conduit element. This relationship of diameters ensures that the gasket will be formed by the conduit element during its insertion into the socket. Such deformation is necessary in order that the lips of the gasket will be urged tightly against the surface of the groove and conduit element respectively, and this tight contact provides a seal against leakage of fluid into or out of the pipe.

Figure 2a shows a conduit element and gasket just as the leading edge of the inclined surface 19 first contacts the gasket, as at C. The distance from the surface 28 to the line of initial contact C (measured perpendicular to surface 28) is no greater than the distance from the surface 28 to the bottom of the recesses 33. Most advantageously the initial contact line C lies about midway between the plane of surfaces 28 and the plane of the bottom of the recesses 33. Stated in another way the initial contact is in the region or portion of the gasket in which the recesses 33 are located, rather than in the region of the solid part 25. With this arrangement the initial force needed to advance the conduit into the socket and deform the gasket need only be large enough to overcome the stiffness of the material and commence the bending of the inner lip of the gasket toward the outer lip (thus collapsing the gasket recesses). Such force is considerably less than that required to appreciably distort the solid body portion 25 of the gasket. Thus it is seen that the invention provides for initial deformation of the gasket substantially by collapsing an apertured part rather than by distorting a solid part. However, the outside diameter of the end portion of the conduit element preferably approximates or is slightly larger than the inside diameter of the main body portion 25 of a gasket in position in the coupling so that some distortion of portion 25 will occur after the conduit end is pushed past the point of initial contact. The manufacturing tolerances should be selected so that some distortion of the solid body portion 25 occurs even during assembly of parts on the "loose" side of the tolerances.

The left-hand portion of Fig. 2 illustrates the position of a gasket after a conduit element has been inserted into the socket. It is here noted that assembly is facilitated by the use of a lubricant between the gasket and the surface of the pipe during insertion into the socket. It has been found convenient to apply a suitable lubricant, such as soap, to the tapered surface of the gasket.

The invention makes possible the use of gaskets of relatively small size in relation to the other parts of the coupling, while nevertheless providing increased force tending to seal the joint against leakage. The use of smaller gaskets results in a marked advantage over various prior art arrangements which require gaskets of relatively large cross section in order to provide adequate sealing force. This advantage relates to the force necessary to insert a conduit element into a socket and, during such insertion, deform the gasket. Indeed it has been found possible to assemble the coupling of the invention manually rather than with the use of auxiliary clamps or jacks which are necessary in order to provide the large axial force needed to assemble the devices of the prior art. The use of such clamps and jacks presents practical difficulties because of the confined working space so often encountered in the field, especially when assembling pipes under culverts, roadways, etc. It is here noted that the larger sizes of pipe may present special handling problems as a result of the weight involved but that the ordinary installation involving pipe sections of average size can be accomplished by manual manipulation of all parts by a couple of operators.

It has been found that the axial force necessary to assemble the coupling of the invention is, in general order of magnitude, about one tenth as large as the force needed to assemble various types of prior devices.

The invention provides stiffening means for the gasket which afford auxiliary force tending to urge the lips of the gasket toward the groove surface and conduit element surface respectively. As shown in Figs. 1, 2 and 3, the axial face of the gasket more remote from the enlarged mouth is provided with a plurality of annularly arranged recesses or pockets 33. Such recesses may be circular as shown in Fig. 3, or rectangular as shown in Fig. 7. In either case the generally bridge-like material 33a between adjacent recesses stiffens the gasket. The bridges 33a tend to hold the lips of the gasket apart and thus minimize the tendency for the inner lip to buckle or become corrugated as a conduit is forced home. Such buckling around the conduit is undesirable since it may provide passages for leakage between the inner lip and the surface of the conduit.

It has been found that, by use of a gasket including stiffening means, it is possible to substantially reduce the size of the gasket with relation to the socket member and conduit elements (as compared with the size of gasket necessary in various prior art arrangements) while maintaining sealing force effective to prevent leakage of the assembled joint.

The stiffened gaskets which involve the provision of a plurality of recesses, will be deformed by the insertion of a conduit element to assume the shape shown in Figure 4 and in the left-hand portion of Figure 2. The recesses are not entirely collapsed during deformation. This is of importance since there is thereby provided means for increasing the sealing force when the pressure inside the pipe increases. This result follows because the pressure fluid inside the pipe will flow into and fill the semi-collapsed recess and exert a spreading force. It is also pointed out that the bottom portion of the recess is only slightly collapsed, while the rim is considerably collapsed, for instance to elliptical shape as shown in Figure 4.

Gaskets having cross-sectional shapes such as those shown in the drawings are easier and less expensive to manufacture than the gaskets generally required in prior art devices which have more complex cross-sectional shapes.

Attention is now turned to the feature of the invention providing for limitation of the travel of a conduit element into a socket and ensuring the maintenance of adequate space between the end faces of assembled conduit elements to permit both the expansion and contraction resulting from changes in the moisture content of the elements and that resulting from changes in temperature.

As seen in Figures 5 and 6, a U-shaped spacer tool 40 may be used as stop means during assembly. This spacer is shaped to contact the surface of the end portion of a shouldered conduit element at three points 41, 42 and 43. During assembly, the spacer tool 40 is placed over the end portion of a conduit element. As the element is forced into the socket the end face of the socket member will abut one face of the spacer tool and the shoulder 17 on the conduit element will contact the other face of the tool. Such abutment prevents further insertion of the conduit element into the socket. Thereafter the spacer tool may be removed.

The relation between the axial length of the free ends of the conduit elements beyond the shoulders and the axial length of the socket member is such that the interposition of the spacer tool during insertion of each conduit element into its socket maintains the end faces of the conduit elements out of contact. The resulting space between the assembled conduit elements makes possible expansion and contraction without interfering with the effectiveness of the joint.

Figure 8 illustrates another form of stop means according to the invention, this form being used with conduit elements which need not have a shoulder adjacent the end. The stop means in this embodiment of the invention takes the form of a resilient ring 44 which may be inserted into the socket member intermediate the two gaskets, into a groove 45 for maintaining the spacer ring in proper axial position. The spacer ring includes a pair of annular radially extending flanges 46 and 47 which extend into the paths of travel of the end faces of the conduit elements during their insertion into the sockets. When the end face of a conduit element abuts one of the flanges on the spacer ring, further axial movement of the conduit element into the socket is impeded. The operator can readily "feel" the contact of the conduit element with the flange. Since the spacer ring and flanges 46 and 47 are composed of yielding material, expansion of the assembled conduit elements will tend to collapse the flanges toward each other.

When using the specially stiffened gaskets of the invention it is unnecessary to maintain close fit of the conduit elements and sockets. Thus it is feasible to employ ordinary tolerances, say plus or minus 1/32", in the manufacture of both the socket members and the conduit elements. In this connection it is pointed out that it is desirable to make the conduit elements fit rather loosely into the sockets in order to facilitate insertion. Because of the additional sealing force of the stiffened gaskets, it is possible to make the fit loose enough so that angular misalignment of the conduit elements with respect to each other, up to about 5°, will not interfere with the joint. The effectiveness of the joint, even with axial misalignment of the pipe sections, is an important feature of the invention since it is extremely difficult in the field to maintain axial alignment within close tolerances. Indeed, it is often convenient to intentionally misalign the pipe sections in order to accommodate slight variations in the pipe trench and avoid further digging.

We claim:

1. A coupling for conduit elements of the kind having a generally cylindrical portion terminating in an end portion having a tapered external surface inclined with respect to the axis of said conduit element, said coupling comprising, a socket member having a socket in an end face thereof for receiving the end of a conduit element, a resilient ring gasket, said socket member having an internal annular groove adapted to receive said gasket, said gasket being positioned in said groove and comprising an annular solid main body portion located toward the entrance to the socket of the socket member and a lip portion located toward the interior of the socket member, said gasket in the groove being in relatively tight surface contact with the peripheral surface of the groove, the minimum inside diameter of the solid body portion being greater than the outside diameter of the smaller end of the tapered portion of the conduit element and being smaller than the outside diameter of the generally cylindrical portion of the conduit element whereby to provide for compression of the solid body portion of the gasket by a conduit element positioned in the coupling, said lip portion including outer annular lip means adapted for cooperation with the surface of said groove and inner annular lip means adapted for cooperation with the surface of the conduit element, said outer and inner annular lip means being separated by an intermediate portion having a plurality of relatively small annularly arranged closely spaced recesses therein, each such recess being of depth sufficient to form a cavity in the gasket extending through the lip portion to the solid body portion to maintain said lip means in contact with the conduit element and socket member when assembled, the minimum inside diameter of said inner lip means being smaller than the outside diameter of the smaller end of the tapered portion of the conduit element, whereby the initial contact between the free end of a conduit element and the gasket during assembly of the conduit element into the socket is in the region of the gasket in which the recesses are located, said gasket when positioned in said groove having a tapered internal surface inclined in direction to provide an enlarged mouth for first receiving the end of the conduit element, the angle of inclination of the inclined gasket surface being greater than that of the inclined surface of the conduit element end portion, whereby to minimize friction between the two inclined surfaces.

2. A construction according to claim 1 in which the socket member has two like sockets, one in each of opposite end faces thereof, the conduit elements each have a shoulder toward the coupling end thereof, and in which said shoulder and the adjacent end face of the socket member are adapted to abut against opposite sides of a spacing tool during assembly of a conduit element into the socket, the shoulder being spaced from the end of the conduit element a distance selected so that, when each conduit element has been assembled into its socket until the spacing tool abuts the end face of the socket member and the shoulder on the conduit element, a free space remains within the socket member between the ends of the conduit elements, whereby to provide freedom for axial movement of the assembled conduit elements in response to expansion and contraction.

References Cited in the file of this patent

UNITED STATES PATENTS

| | | |
|---|---|---|
| 685,818 | Close | Nov. 5, 1901 |
| 1,802,177 | Knight | Apr. 12, 1931 |
| 1,924,020 | Bihet | Aug. 22, 1933 |
| 2,028,668 | Hewett | Jan. 21, 1936 |
| 2,040,155 | Shoemaker | May 12, 1936 |
| 2,131,839 | Hall | Oct. 4, 1938 |
| 2,165,052 | Hering | July 4, 1939 |
| 2,223,434 | Trickey | Dec. 3, 1940 |
| 2,230,725 | Nathan | Feb. 4, 1941 |
| 2,259,940 | Nathan | Oct. 21, 1941 |
| 2,261,566 | Russell et al. | Nov. 4, 1941 |
| 2,294,142 | Turner | Aug. 25, 1942 |
| 2,432,592 | Stecher et al. | Dec. 16, 1947 |
| 2,490,907 | Kellaher et al. | Dec. 13, 1949 |
| 2,738,992 | Heisler | Mar. 20, 1956 |
| 2,808,275 | Sherman | Oct. 1, 1957 |

FOREIGN PATENTS

| | | |
|---|---|---|
| 132,107 | Australia | Apr. 7, 1949 |